Jan. 19, 1926.  1,570,221
F. J. ANDEL
BRAKE EQUALIZING ATTACHMENT FOR AUTOMOBILES
Filed Jan. 19, 1925   2 Sheets-Sheet 1
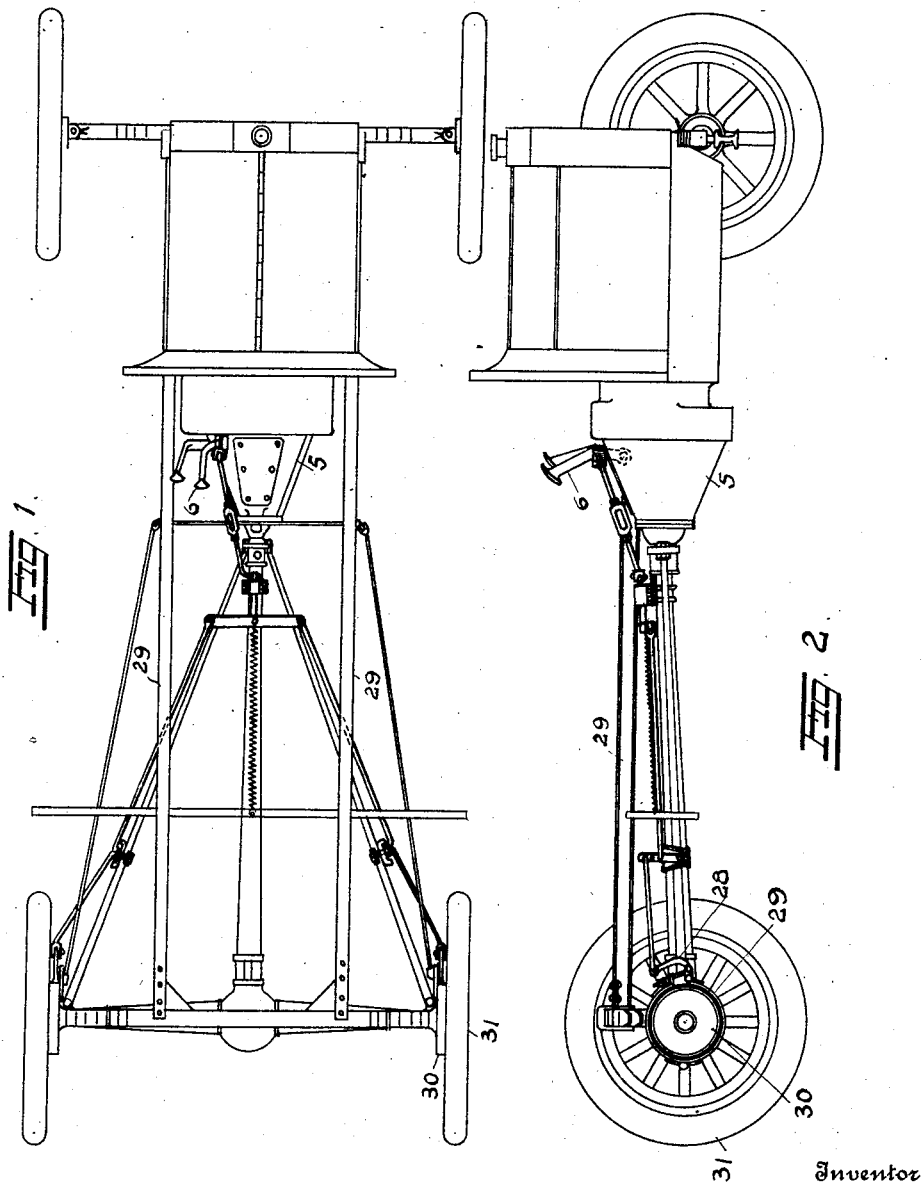
FRANK. J. ANDEL.

Jan. 19, 1926. 1,570,221
F. J. ANDEL
BRAKE EQUALIZING ATTACHMENT FOR AUTOMOBILES
Filed Jan. 19, 1925 2 Sheets-Sheet 2
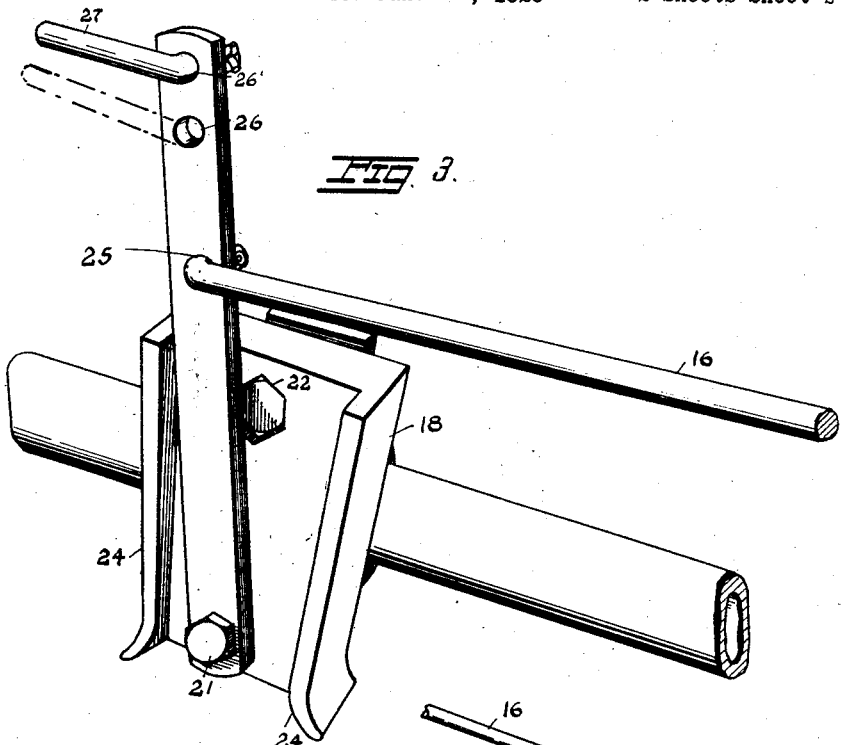
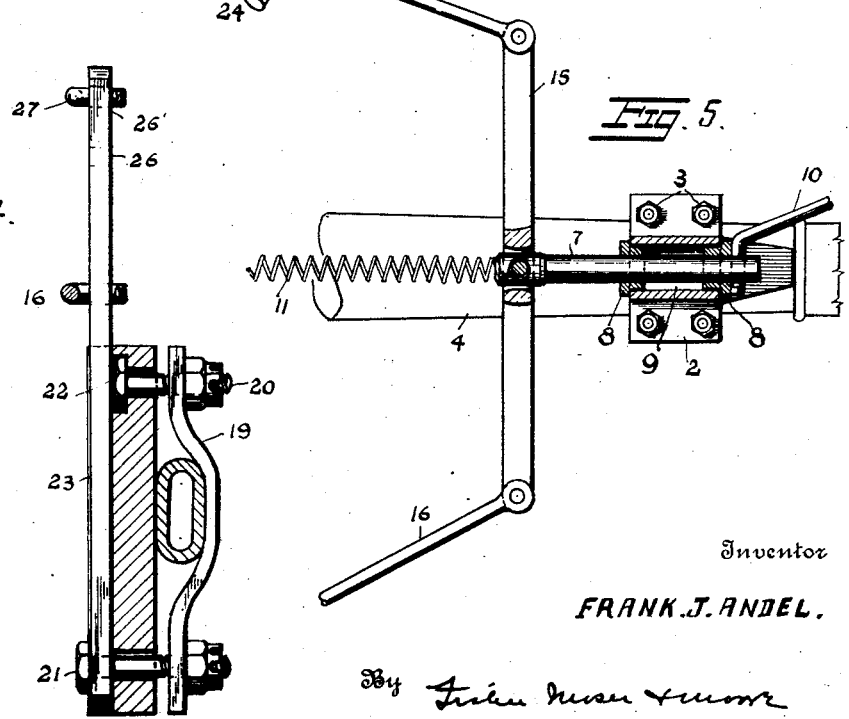
Inventor
FRANK J. ANDEL.
By
Attorney Patented Jan. 19, 1926.

1,570,221

UNITED STATES PATENT OFFICE.

FRANK J. ANDEL, OF CLEVELAND, OHIO.

BRAKE-EQUALIZING ATTACHMENT FOR AUTOMOBILES.

Application filed January 19, 1925. Serial No. 3,317.

*To all whom it may concern:*

Be it known that I, FRANK J. ANDEL, a citizen of the United States, residing at Cleveland, in the county of Cuyahoga and State of Ohio, have invented certain new and useful Improvements in a Brake-Equalizing Attachment for Automobiles, of which the following is a specification.

My invention relates to a brake equalizing attachment for automobiles, the present invention being an improvement in the equalizing attachment shown and described in my application for patent, Serial No. 690,576, filed Feb. 4, 1924. In general my object is to provide a practical device for operating the brake bands of the two rear wheels of an automobile with equalizing effect, the device being particularly constructed to permit its attachment to certain types of vehicles not equipped with foot treadle operating devices for the rear wheel brakes. In my Letters Patent No. 1,455,562 of May 15, 1923, I show a brake operating attachment for a car of the Ford type, and the present improvement is designed to be mounted upon the draft rigging of such cars to operate a pair of brakes of that kind.

In the accompanying drawings, Fig. 1 is a top view of an automobile chassis, including my improved attachment for operating a pair of brake bands for the rear wheels. Fig. 2 is a side elevation of Fig. 1, the wheels and other parts in the foreground being omitted to disclose the attached device. Fig. 3 is an enlarged perspective view of the lever attachment employed to connect the equalizing device and the brake with differential braking movements. Fig. 4 is a vertical section of the lever attachment illustrated in Fig. 3. Fig. 5 is a horizontal section and top view of the equalizing device which is adapted to be attached to the tubular housing for the transmission shaft.

The present invention comprises a bracket member 2 adapted to be clamped rigidly by clamping bolts 3 upon the transmission shaft housing 4 closely adjacent the transmission casing 5 of an automobile such as the Ford car in which a brake pedal 6 is provided at one side of the longitudinal median line of the shaft and casing. A short shaft 7 is slidably confined within flanged bushings 8—8 fixed in the opposite ends of a horizontal bore 9 in the upper part of bracket 2, and a short connecting rod 10 is attached to the exposed front end of shaft 7 and to brake pedal 6 to permit this shaft to be drawn forward against the tension of a coil spring 11 which is connected with the rear part of the shaft or an equalizing lever 15 which is pivoted at its middle to head of shaft 7. A pair of pull rods 16—16 are pivotally connected to the opposite ends of lever 15 and extend rearwardly on diverging lines more or less parallel with the radius rods 17—17 of the vehicle. Attached to each radius rod is a flanged or channeled plate 18 which is held in an upright position by a clamping strap 19 having offset extremities which are engaged by a pair of clamping bolts 20 and 21, respectively. The head of upper bolt 20 is seated within a hexagonal recess 22 to lock the bolt from turning and to give clearance for the swinging movement of an upright lever 23 which is pivoted at its lower end to lower bolt 21. The outwardly extending flanges 24 at each side edge of plate 18 limit the swinging movement of the lever 23, and the lever is adapted to be oscillated by pull rod 16 which has an angularly bent extremity extending through an opening 25 located in the middle part of the lever. Two or more openings 26—26' in the upper part of the lever 23 permit a second pull rod 27 to be connected thereto at a greater or lesser distance from its pivot, and rod 27 connects with the pivoted arm or crank member 28 which serves to contract the brake band 29 externally on the brake drum 30 of a rear wheel 31. Each rear wheel is so equipped, and duplicate brake operating connections extend therefrom to equalizing lever 15. As a result when brake pedal 6 is pressed forward the centrally located equalizing lever 15 is drawn forward and the rods 16—16 pull the upright levers 23 forward in the same degree, while the second pull rods 27 which are connected to the longer end of the upright levers are drawn forward in greater degree, thereby augmenting the movement required to contract the brake bands as compared with the movement applied to brake pedal 6. When the brake bands are new the upper pull rod 27 may be connected with the lower opening 26 in upright lever 23, and if wear occurs and an additional movement is required for effective braking results, the rod may be shifted to the higher opening 26'.

With this attachment a straight pull is imparted to equalizing lever 15 and a uniform pull applied to the operating members for the brake bands, and braking may be sensitively controlled due to the augmented movement obtained by the use of the intermediate levers attached to the radius rods. The rear pull rods 27 are shorter than the front rods 16, and this arrangement permits the attachment plates 18 and upright levers 23 to be mounted on the radius rods outside of the chassis frame 29 near the rear wheels where these parts are accessible and their attachment or adjustment is facilitated.

What I claim, is:

1. In an automobile having rear wheel brakes and a drive shaft housing and radius rods, a brake equalizing attachment comprising a bracket adapted to be clamped to said housing, an equalizing lever movably mounted upon said bracket, a pedal connection for said lever, auxiliary levers affixed to said radius rods, operating connections extending between said equalizing lever and auxiliary levers, and additional operating connections extending from said auxiliary levers to said brakes.

2. A brake equalizing attachment for an automobile having a drive shaft housing and radius rods, comprising a bracket affixed to said housing, a sliding shaft in said bracket, an equalizing lever attached at said shaft, supplementary levers affixed to said radius rods, and connecting rods extending from said supplementary levers to said equalizing lever and the brakes for said automobile.

3. An automobile having wheel brakes and a drive shaft housing and radius rods, in combination with a bracket and means adapted to affix the same to said housing, a reciprocable member supported by said bracket, a spring adapted to move said member in one direction, an equalizing lever pivoted to said member, supplementary levers affixed to said radius rods having connecting rods attached to said equalizing lever, and other rods extending from said supplementary levers to said rear brakes to augment the braking movement derived from the equalizing lever.

4. A brake equalizing attachment, comprising a bracket and means adapted to detachably bolt the same to a part of the transmission housing of an automobile, a shaft having slidable bearing within said bracket, a coiled spring connected to said shaft, an equalizing lever pivotally connected to said shaft, supplementary levers pivoted at one end to plates attached to diverging rods on said automobile and having operating connection with said equalizing lever, and rods connecting the rear wheel brakes of said automobile with the free ends of said supplementary levers.

5. An equalizing brake attachment for an automobile having rear wheel brakes and a drive shaft housing and diverging radius rods, comprising a bracket affixed to said housing having a reciprocable shaft operatively connected with a brake pedal, an equalizing rod attached to said shaft, flanged plates clamped vertically upon said radius rods having oscillatory levers mounted thereon, operating rods connecting the outer ends of said equalizing levers with an intermediate part of said oscillatory levers, and connecting rods extending from the movable ends of said oscillatory levers to said brakes.

6. A braking attachment for an automobile having a radius rod, comprising a plate, a device adapted to clamp said plate to a radius rod, and a lever pivoted to said plate having a plural number of openings in its free swinging end adapted to permit brake operating connections to be made therewith at different distances from the lever pivot.

7. A braking attachment for an automobile having a radius rod, comprising a channeled plate having a lever adapted to oscillate therein, a clamping strap and bolts adapted to affix said plate to said rod, one of said bolts extending through said plate and forming a pivot for said lever, and brake operating connections attached to the free end of said lever at different distances from said pivot bolt.

8. A brake equalizing attachment for an automobile having a drive shaft housing, comprising a bracket, means adapted to clamp said bracket to said housing, a reciprocable shaft extending through said bracket having an operating rod connected at one end thereof, an equalizing lever pivotally connected at its middle to the opposite end of said shaft, and connecting rods and supplementary levers adapted to compound the braking movement applied to said equalizing lever.

In testimony whereof I affix my signature.

FRANK J. ANDEL.